J. MASSON.
INDICATOR OF SPEEDS OF ROTATION.
APPLICATION FILED MAY 6, 1913.

1,135,827.

Patented Apr. 13, 1915.
2 SHEETS—SHEET 1.

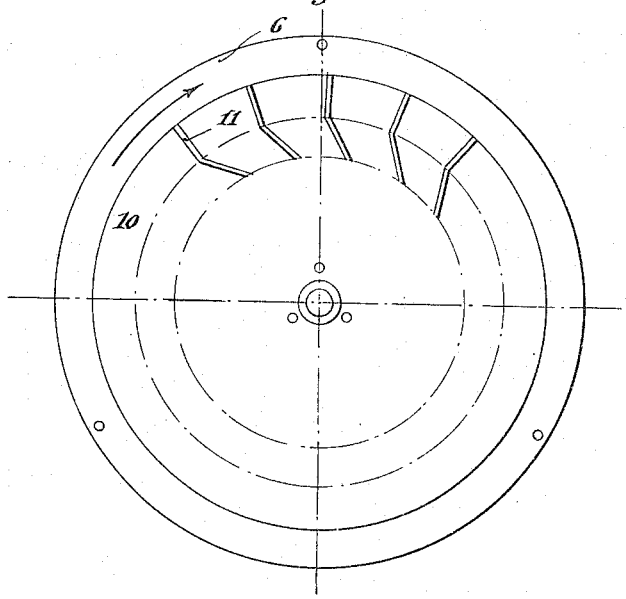
Fig. 4
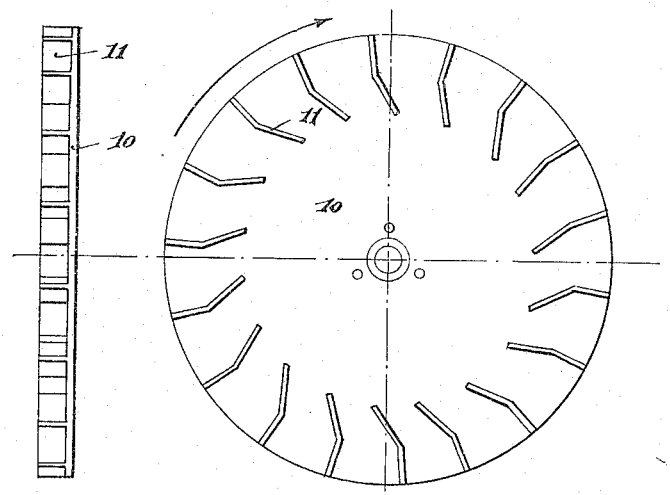
Fig. 6ᵃ   Fig. 6

UNITED STATES PATENT OFFICE.

JULES MASSON, OF PARIS, FRANCE, ASSIGNOR TO SOCIÉTÉ ANONYME DES TELE-GRAPHES EDOUARD BELIN, OF PARIS, FRANCE.

INDICATOR OF SPEEDS OF ROTATION.

1,135,827.  Specification of Letters Patent.  Patented Apr. 13, 1915.

Application filed May 6, 1913. Serial No. 765,926.

*To all whom it may concern:*

Be it known that I, JULES MASSON, citizen of the Republic of France, residing at Paris, in the Republic of France, have invented a certain new and useful Indicator of Speeds of Rotation, of which the following is a specification.

This invention has for its object an apparatus intended to indicate speeds of rotation of parts of all kinds, and more particularly the speeds of vehicle wheels and consequently the speed of travel of a vehicle. It is characterized by its simplicity of construction which renders any derangement impossible and by its being arranged in a closed box which prevents any fouling with road dust or the like.

Figure 2:
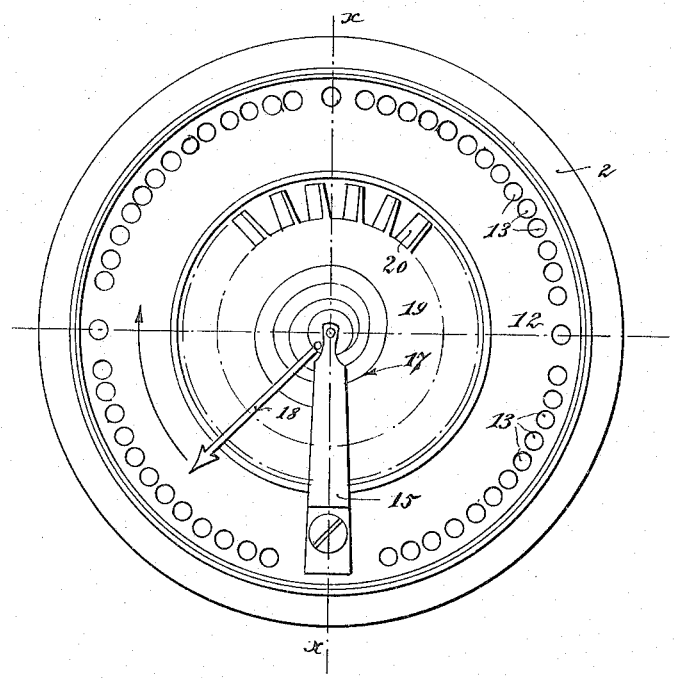
Figure 3:
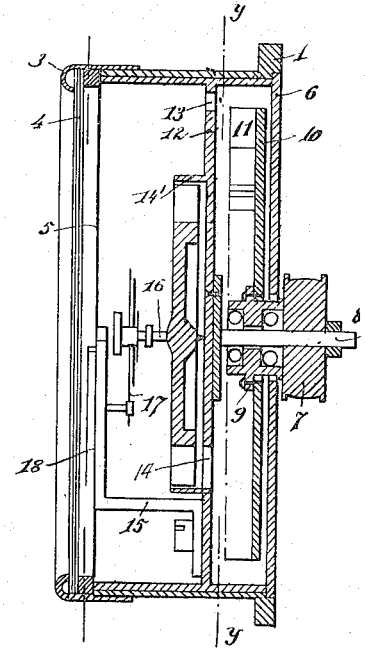
Figures 5, 5A:
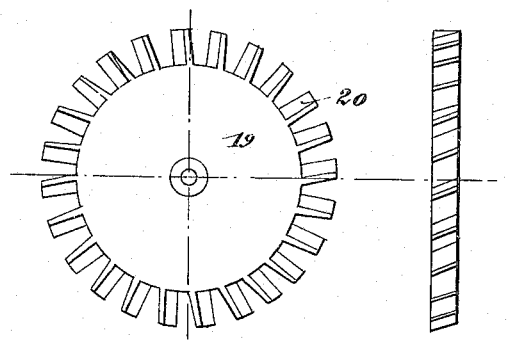
Figure 1:
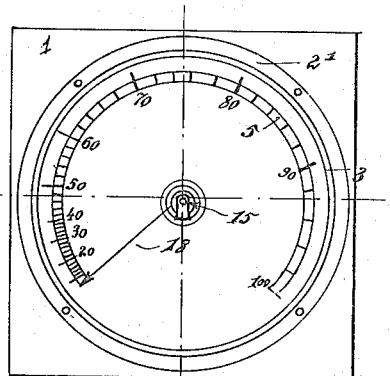

Now referring to the accompanying drawings: Figure 1 is a front view of the instrument; Fig. 2 a similar view, on an enlarged scale, with the dial removed; Fig. 3 a section on the line $x$—$x$ of Fig. 2; Fig. 4, a section on the line $y$—$y$ of Fig. 3; Figs. 5 and 5$^a$, a front and side view of a part; Figs. 6 and 6$^a$, a front and side view of another part.

A box 2, closed in front by a cover 3 with a glass plate 4, behind which appears the dial or scale 5, and at its rear part by a plate 6 is fixed on a frame or mount 1 of any suitable kind adapted to the arrangement of the apparatus. Through the plate 6 passes a sleeve 7 carried by a shaft 8, a ball bearing 9 being used, if required.

On the outer part of the sleeve 7, the driving member acts, this member being connected with the part the speed of which it is desired to ascertain; this connection may be any suitable one (belt, gearing, flexible transmission, etc.).

A suction creating member comprising a plate 10 adapted to rotate about a shaft 8 and having on its front face a series of vanes 11 set at one end at an angle of 45° with the radius, and at the other end radially, as shown in Figs. 4 and 6, is rotated by the driving means. This plate revolves in the direction indicated by the arrow. In this movement the vanes 11 cause a violent displacement of the air from the center toward the periphery.

In front of the plate 10 in the box 2, is a partition 12 which carries the shaft 8, and this partition is perforated at a large number of points 13 near the edge, the apertures 13 being arranged in a circle, and the partition 12 is also formed with a series of apertures 14 arranged in a circle, both circles or rings of apertures being concentric with the shaft 8. This circle of apertures 14 has its largest radius practically equal to the radius of the circle of the inner tips of the vanes 11.

A bent arm 15 is fixed on the partition 12. Between this arm 15 and the center of the partition 12, a shaft 16 is mounted so as to be free to turn. A spiral spring 17 fixed at one end to the arm 15 and at the other end to the shaft 16 tends to maintain the latter in a position indicated by the position of the pointer 18 in the drawings. Finally, a plate 19 having external vanes 20, shown in detail in Figs. 5 and 5$^a$, is fixed on the shaft 16; the vanes are exactly opposite the openings 14 in the partition 12. An annular flange 14′ is fixed to the outer face of partition 12 and is arranged concentric with and inclosing plate 19 for preventing direct radial access of the air current to the vanes.

When the plate 10 rotates as has been stated, it causes a rapid movement of air toward its periphery, and therefore air is drawn through the openings 14, that is to say, there is a current of air from the front to the rear on the vanes 20, and the plate 19 tends to be displaced until counterbalanced by the tension of the spring 17. The pointer will thus be displaced on the scale and such displacement will be the greater according as the force acting on the plate 19 increases, that is to say, according as the speed of the current of air in the wings 20 increases, which happens as the plate 10 increases its rapidity of rotation. It must be noted that the air thus thrown to the periphery of the plate 10 produces an excess pressure at this point and it is thus discharged through the perforations 13 creating thus a superpressure in the front compartment of the box and facilitating the movement of the air over the vanes 20. There is in fact a forced circulation of air from the rear to the front through the apertures 13 and from the front to the rear through the openings 14 acting at this latter point on the wings 20. No external air is drawn in and consequently there is no dust nor wear. Only one member revolves and that is the plate 10; the plate 19 has only a more or less great angular displacement and therefore its pivots are not worn. The spring 17 has only to oppose this angular displacement, it is therefore subjected to a regular tension without jerks, and therefore its molecular condition has no tendency to vary or to change its strength. The scale will therefore always be comparable to its original condition. As the pressure on the vanes 20 increases in proportion to the square of the speed of the air which strikes them, it follows that the displacements of the needle will be longer in proportion as the speed increases, and it is therefore necessary to have a scale with gradually increasing graduations (see Fig. 1), that is to say, the speed will be ascertained much more easily and with an easier scale division for the eye sight as the speed increases and this is a very important and very useful point.

Having now particularly described and ascertained the nature of my said invention and in what manner the same is to be operated, I declare that what I claim is:

1. A speed indicator comprising a casing, a partition therein dividing the casing into compartments, a flange extending laterally from the partition, apertures being formed in the partition at opposite sides of the flange, circulating means forcing air through the aperture at one side of the flange about the flange and through the aperture at the other side thereof, and indicator actuating means adapted to be operated by the current of air and disposed in the path of the current adjacent the flange.

2. In a speed indicator, the combination with a casing and a partition dividing the same into compartments, of a rotary vane in one compartment adapted to be rotated for creating circulation of air in the casing, the partition being formed with apertures enabling circulatory movement of air from one compartment into and through the other, a rotatably mounted vane at the opposite side of the partition of the first mentioned vane and having blades disposed in the line of circulation, and an annular guard flange outstanding from the partition and surrounding the last-named vane for preventing radial access of air currents to the blades of the last-named vane.

3. A speed indicator comprising an annular casing, a disk-shaped partition in said casing dividing the casing between its ends into compartments and having openings therein, a fluid circulating member revolubly mounted in one compartment, and indicating means disposed in the other compartment adjacent the openings and adapted to be actuated by the circulating fluid as it passes through the openings.

4. A speed indicator comprising a casing divided into communicating compartments, a rotatable member mounted in one of said compartments for exhausting air therefrom and driving the same into the other of said compartments, indicating mechanism disposed in the last mentioned compartment and comprising a vaned wheel adapted to be operated by the air driven into its compartment, means normally tending to resist movement of the vaned wheel, and an indicator connected to said wheel for registering the extent of movement of the latter.

5. A speed indicator comprising a casing, a partition therein having concentrically arranged series of openings therethrough, a suction creating member disposed in one of said compartments and adapted to exhaust air therefrom through one series of the openings aforesaid into the other compartment, indicator mechanism disposed in the last mentioned compartment and comprising a wheel formed with vanes, said wheel being arranged with its vanes adjacent the other series of openings aforesaid whereby to be actuated by the circulation of air as it passes from the compartment in which the indicator mechanism is disposed to the compartment containing the suction creating member, a spring normally resisting movement of the vaned wheel, and an indicator connected with said wheel for indicating the movements of the same.

In witness whereof I have hereunto signed my name this 25th day of April, 1913, in the presence of two witnesses.

JULES MASSON.

Witnesses:
ANTONIO MONTEILHET,
HANSON C. COXE.

Copies of this patent may be obtained for five cents each, by addressing the "Commissioner of Patents, Washington, D. C."